United States Patent
Nishiwaki et al.

(10) Patent No.: US 7,182,520 B2
(45) Date of Patent: Feb. 27, 2007

(54) FULL TYPE TAPERED ROLLER BEARING

(75) Inventors: Hideshi Nishiwaki, Kuwana (JP); Yukihiro Takeda, Kuwana (JP)

(73) Assignee: NTN Corporation, Osaka (JP)

( * ) Notice: Subject to any disclaimer, the term of this patent is extended or adjusted under 35 U.S.C. 154(b) by 89 days.

(21) Appl. No.: 11/081,706

(22) Filed: Mar. 17, 2005

(65) Prior Publication Data

US 2005/0207690 A1    Sep. 22, 2005

(30) Foreign Application Priority Data

Mar. 19, 2004   (JP) .............................. 2004-081305

(51) Int. Cl.
*F16C 33/49*    (2006.01)
(52) U.S. Cl. ..................... 384/577; 384/571
(58) Field of Classification Search ................ 384/571, 384/572, 575–580
See application file for complete search history.

(56) References Cited

U.S. PATENT DOCUMENTS

| | | | | |
|---|---|---|---|---|
| 2,105,013 | A | * | 1/1938 | Scribner ..................... 384/560 |
| 3,578,831 | A | * | 5/1971 | Scheifele ..................... 384/571 |
| 5,039,231 | A | * | 8/1991 | Kispert et al. .............. 384/572 |
| 6,315,459 | B1 | * | 11/2001 | Takano et al. .............. 384/572 |

FOREIGN PATENT DOCUMENTS

| | | | |
|---|---|---|---|
| DE | 3520814 | A1 * | 12/1986 |
| JP | 7-293558 | | 11/1995 |

* cited by examiner

*Primary Examiner*—Thomas R. Hannon
(74) *Attorney, Agent, or Firm*—Wenderoth, Lind & Ponack, L.L.P.

(57) ABSTRACT

A bearing assembly includes a full type tapered roller bearing and a roller presser which prevents separation of the rollers not only during transportation but while the outer ring is not mounted. The roller presser includes a ring member, and a plurality of arms extending from one side of the ring member. Each arm is inserted in one of the triangular spaces defined by the tapered raceway of the outer ring and the adjacent tapered rollers. The arms press the rollers against the inner ring. A pair of diametrically opposed bridges are provided, each extending between the free ends of a pair of adjacent arms. The bridges engage two diametrically opposed rollers, thereby preventing separation of the rollers not only during transportation but also while the outer ring is not mounted.

9 Claims, 9 Drawing Sheets

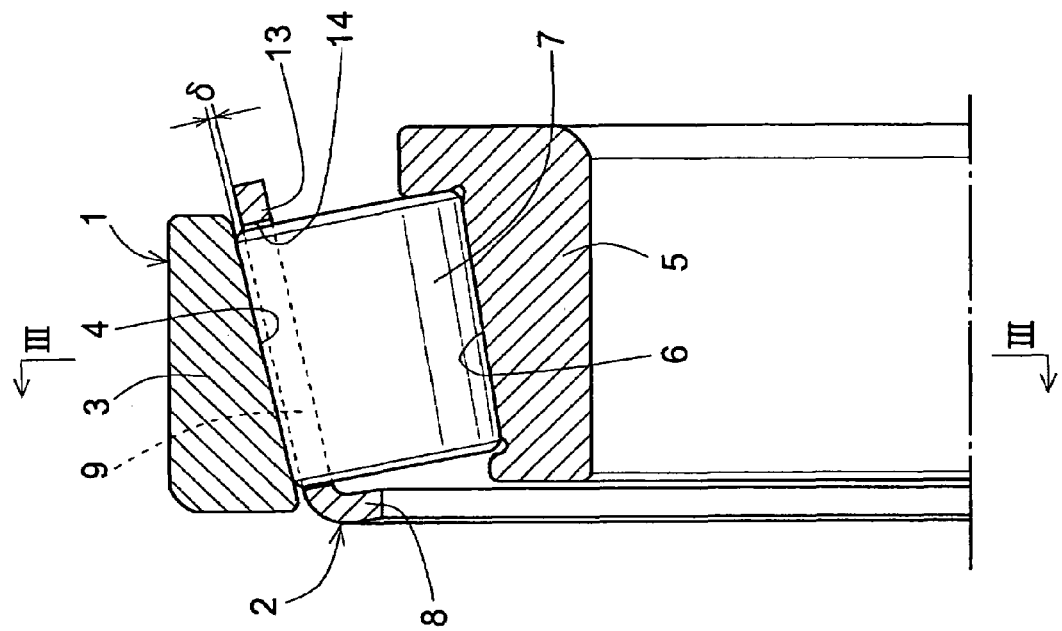
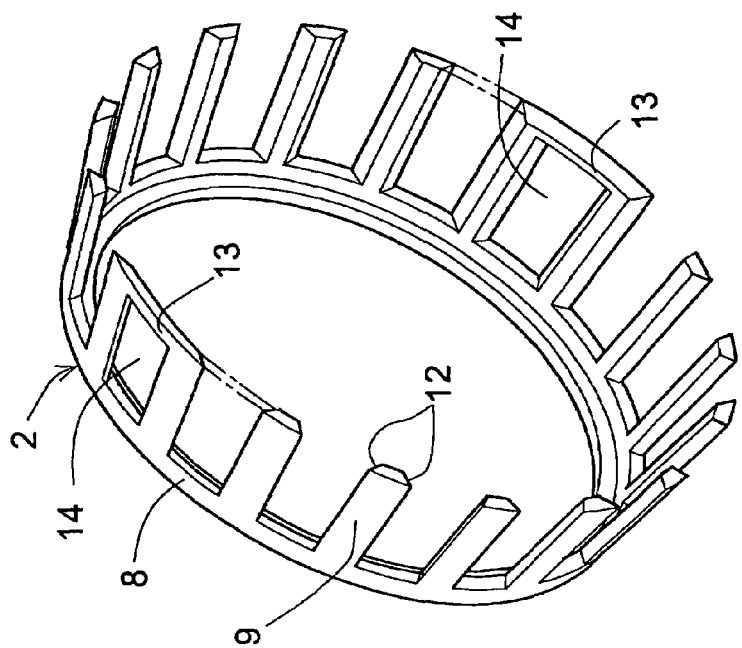

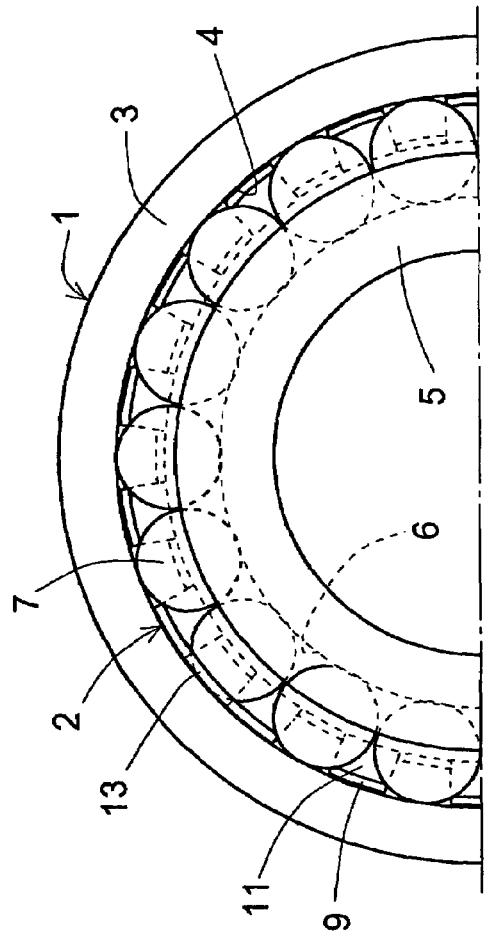
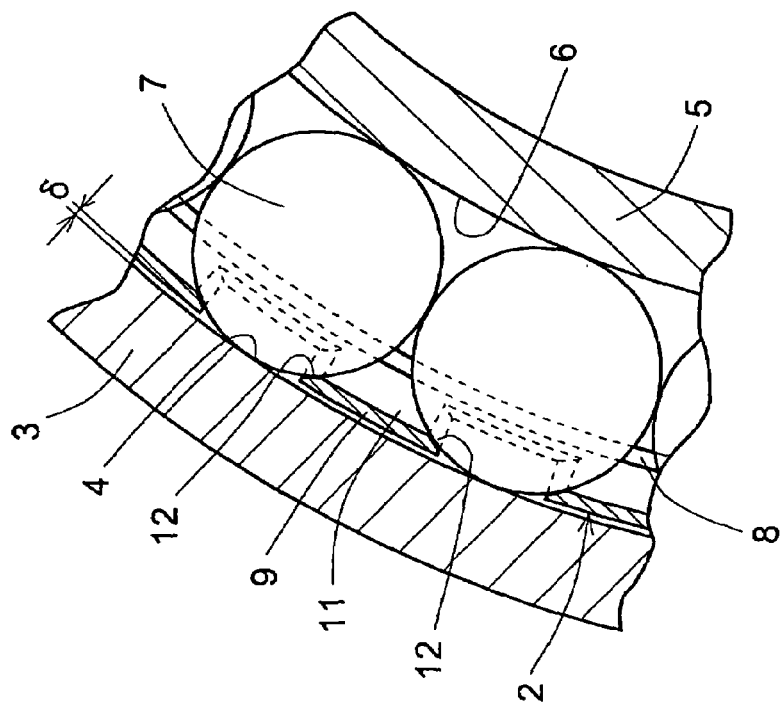

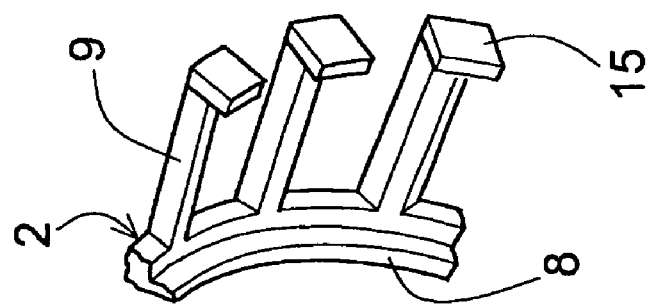
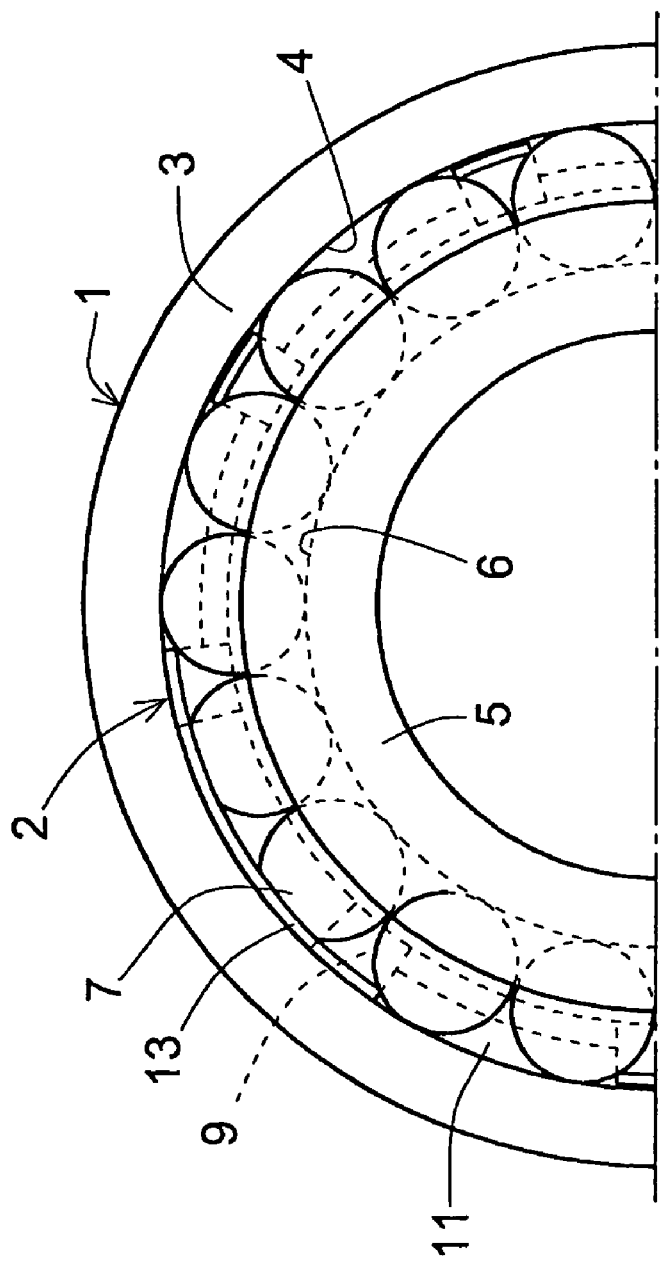

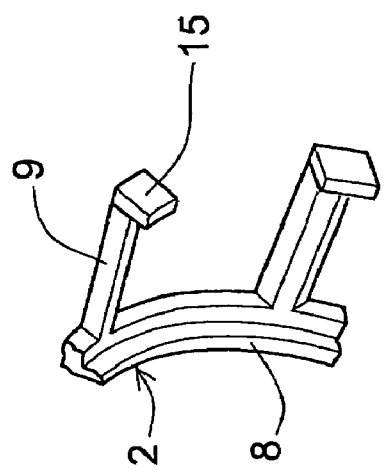
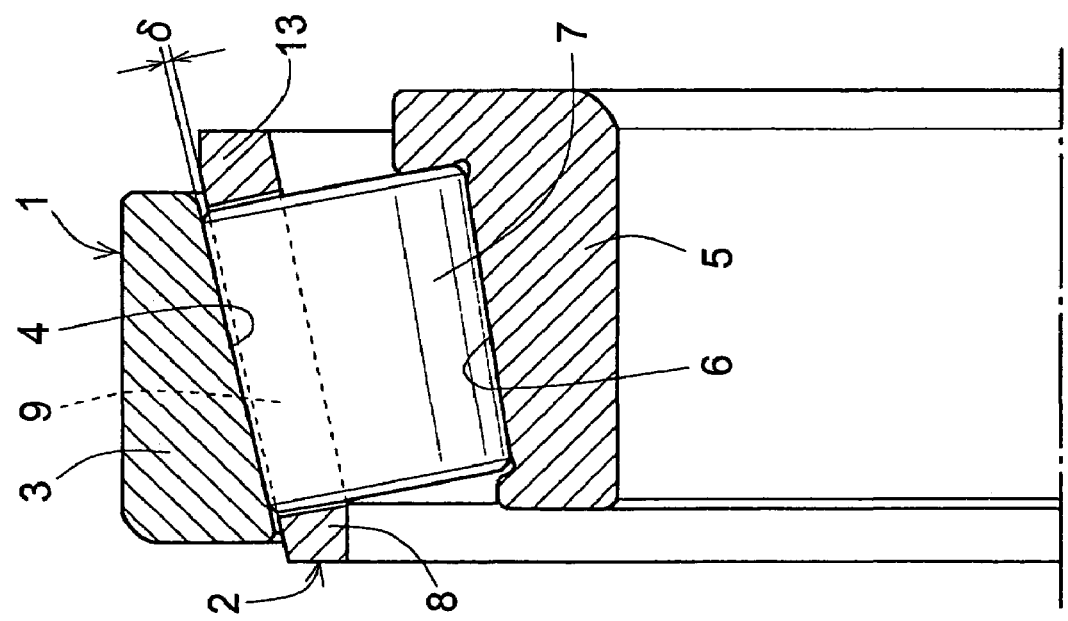

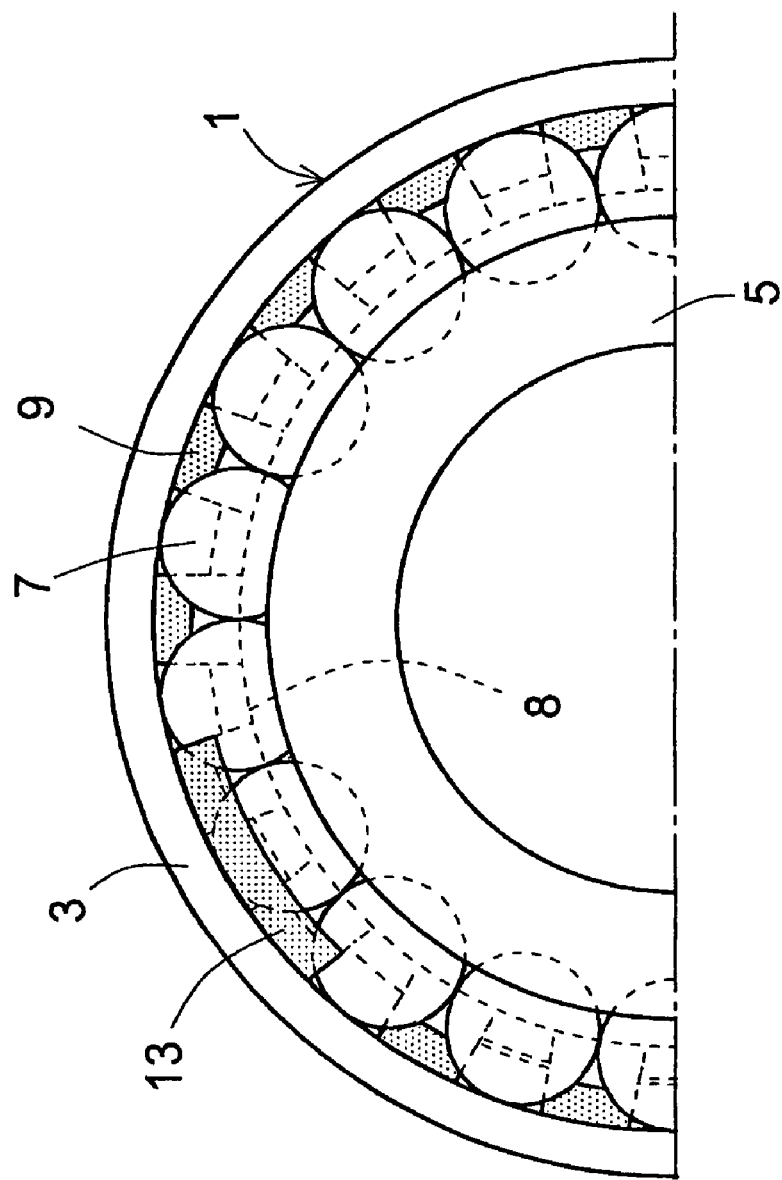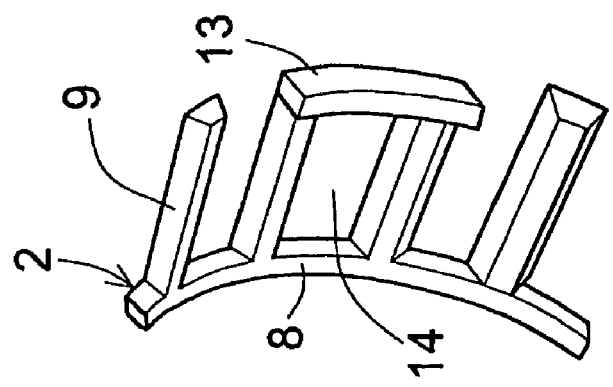

FULL TYPE TAPERED ROLLER BEARING

BACKGROUND OF THE INVENTION

This invention relates to a full type tapered roller bearing having means for preventing separation of the rollers.

Ordinary tapered roller bearings comprise an outer ring having a radially inner, tapered raceway, a flanged inner ring having a radially outer, tapered raceway extending between the flanges at both ends of the inner ring, and tapered rollers disposed between the raceways of the inner and outer rings. The rollers are retained by a retainer. The retainer serves to keep the rollers circumferentially aligned and spaced apart from each other at equal intervals. The retainer also prevents the rollers from falling off during transportation or assembly, or when one of the inner and outer rings is removed.

Full type or retainer-less tapered roller bearings are also known (see JP patent publication 07-293558). By omitting the retainer, it is possible to increase the number of rollers used and thus to increase the rigidity of the bearing. Because this type of bearing has no retainer, the rollers tend to fall off during transportation or assembly. Thus, this type of bearing has various means for preventing a fall of the rollers, such as a snap ring fitted on the raceway of the outer ring, and a ring member mounted on the large-diameter end face of the outer ring (see FIGS. 1 and 6 of the above publication).

Such a snap ring limits, i.e. shortens the effective width of the raceway of the outer ring, thereby shortening the rollers, which in turn lowers the load-bearing capacity of the bearing. Further, since the snap ring is mounted on the outer ring, if it is necessary to remove the outer ring, the snap ring has to be removed, too. Thus, if the outer ring is removed, there is no means for preventing separation of the rollers. The ring member does not lower the load-bearing capacity of the bearing. But because it is mounted on the outer ring, if the outer ring is removed, nothing can prevent separation of the rollers.

Thus, while the abovementioned snap ring and ring member can effectively prevent separation of rollers e.g. during transportation, such means cannot prevent separation of rollers while the outer ring is not mounted, such as when inspecting the bearing by removing the outer ring.

An object of the present invention is to provide a full type tapered roller bearing which can prevent separation of the rollers, not only during transportation but while the outer ring is not mounted, without lowering the load-bearing capacity of the bearing.

SUMMARY OF THE INVENTION

According to this invention, there is provided a bearing assembly comprising a full type tapered roller bearing and a roller presser. The tapered roller bearing comprises an outer ring having a tapered raceway having a minimum diameter at one end thereof and a maximum diameter at the other end thereof, an inner ring having flanges at both ends thereof and a tapered raceway extending between the flanges so as to radially oppose the tapered raceway of the outer ring, and a plurality of tapered rollers disposed between the tapered raceways of the inner and outer rings. Any adjacent ones of the tapered rollers are substantially in contact with each other, and a space is defined by the tapered raceway of the outer ring and any pair of adjacent tapered rollers. The roller presser comprises a ring having a diameter smaller than the minimum diameter of the tapered raceway of the outer ring, and a plurality of arms extending from one side of the ring. The respective arms are circumferentially spaced from each other and each inserted in every or every other one of the spaces so as to be substantially parallel to the tapered raceway of the outer ring. Each of the arms has its longitudinal edges in contact with the tapered rollers on both sides thereof, and at least one of the arms has an engaging portion that engages at least one of the tapered rollers.

The engaging portion of the roller presser prevents separation of the rollers. Thus, even when the outer ring is removed, the engaging portion will reliably prevent separation of the rollers.

Preferably, the arms extend at least from the one end of the tapered raceway of the outer ring to the other end thereof, the ring being disposed radially inside of the tapered raceway of the outer ring near the one end thereof.

The engaging portion may be a bridge extending between the free ends of at least two adjacent arms, or a claw provided at the free end of one of the arms.

The presser arm according to the invention, and particularly its engaging portion, will not lower the load-bearing capacity of the bearing. Since all of the rollers are pressed against the inner ring by the roller presser, the rollers will never separate not only during transportation or assembly but also when the outer ring is not mounted, e.g., for inspection.

BRIEF DESCRIPTION OF THE DRAWINGS

Other features and objects of the invention will become apparent from the following description made with reference to the accompanying drawings, in which:

FIG. 1 is a sectional view of the first embodiment of the invention;

FIG. 2 is a perspective view of a roller presser of the same;

FIG. 3A is a partial side view of the same;

FIG. 3B is a partial enlarged view of FIG. 3A;

FIG. 6 is a partial perspective view of a roller presser of the second embodiment;

FIG. 7 is a partial side view of a third embodiment;

FIG. 10 is a partial perspective view of a roller presser of the fourth embodiment;

FIG. 11 is a partial sectional view of a fifth embodiment;

FIG. 12 is a partial side view of the fifth embodiment;

FIG. 13 is a partial perspective view of a roller presser of the fifth embodiment;

DETAILED DESCRIPTION OF THE PREFERRED EMBODIMENTS

Figure 4:
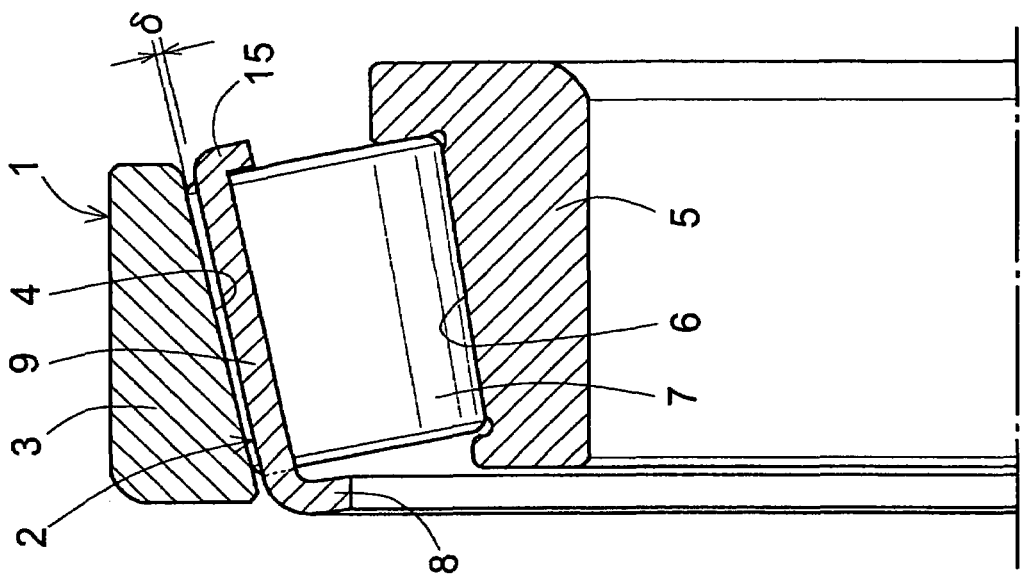
FIG. 4 is a partial sectional view of a second embodiment.

Now referring to the drawings, FIGS. 1–3 show a bearing assembly of the first embodiment, which comprises a full type tapered roller bearing 1 and a roller presser 2. The tapered roller bearing 1 comprises an outer ring 3 having a tapered raceway 4, a flanged inner ring 5 having a tapered raceway 6 extending between the flanges at both ends of the inner ring 5, and tapered rollers 7 disposed between the raceways 4 and 6. The tapered rollers 7 are arranged in a single row in the circumferential direction with any adjacent tapered rollers in contact with each other or separated from each other by a small gap.

The roller presser 2 is made of a metal (sheet steel such as carbon steel) or a polyamide, and comprises, as shown in FIG. 2, a ring 8 having a diameter smaller than the minimum diameter of the raceway 4 of the outer ring 3, and a plurality of arms 9 arranged at equal circumferential intervals along the outer edge of the ring 8 so as to extend therefrom obliquely in one axial direction. As shown in FIGS. 3A and 3B, each arm 9 is inserted in one of substantially triangular (in section) spaces 11 defined by the tapered raceway 4 of the outer ring 3 and the adjacent tapered rollers 7, and is kept in contact with both rollers 7 defining each space 11. Further, each arm 9 has its longitudinal edges 12 chamfered so as to make surface contact, instead of line contact, with the rollers 7 on both sides thereof.

As shown in FIGS. 1 and 3B, the arms 9 are inclined relative to the axial direction so as to extend substantially parallel to the tapered raceway 4 of the outer ring 3, keeping a small distance δ from the raceway 4, over the entire width of the raceway 4, i.e. from its smallest-diameter end to largest-diameter end. In the embodiment shown, the arms 9 are slightly longer than the width of the raceway 4. Thus, they protrude slightly from the largest-diameter end of the raceway 4.

Bridges 13 extend between the free ends of a first pair of adjacent arms 9 and a second pair of adjacent arms 9 diametrically opposed to the first pair, respectively, to define rectangular windows 14 between the first pair of adjacent arms 9 and between the second pair of adjacent arms 9. Two diametrically opposed tapered rollers 7 are received at their radially outer portions in the respective windows 14 with their large-diameter and small-diameter end faces engaged by the bridges 13 and the ring 8 respectively so as to partially protrude radially outwardly from the windows 14. As shown by phantom lines in FIG. 2, each bridge 13 may be extended to connect the free ends of three adjacent arms 9.

Instead of the two diametrically opposed bridges 13, only one or more than two such bridges may be provided, or two such bridges may be provided so as not to diametrically oppose each other.

To assemble the tapered roller bearing assembly of this embodiment, after arranging the tapered rollers 7 on the tapered raceway 6 of the inner ring 5, with the roller presser 2 positioned such that the tips of the arms 9 are disposed between the small-diameter ends of the adjacent tapered rollers 7, the roller presser 2 is pushed into the bearing 1 until the tips of the arms 9 protrude from the large-diameter ends of the tapered rollers 7 as shown in FIG. 1. When the presser 2 is pushed into the bearing 1, the bridges 13 abut the small-diameter ends of the diametrically opposed rollers 7, and expand radially outwardly together with the arms 9 connected to the bridges 13 until the bridges 13 ride onto the outer peripheries of the diametrically opposed rollers 7. Thus, the bridges 13 slide on the outer peripheries of the rollers 7 together with the arms 9 until they reach the large-diameter ends of the rollers 7, where the bridges 13 disengage from the outer peripheries of the diametrically opposed rollers 7 and engage their large-diameter end faces, while the arms 9 drop into the respective spaces 11. Thus, in this state, the diametrically opposed rollers 7 are received in the respective windows 14 at their radially outer portions (see FIGS. 1, 3A and 3B).

In this state, with the ring 8 abutting the small-diameter ends of the tapered rollers 7, the rollers 7, which are kept in contact with the chamfered longitudinal edges of the arms 9, are pressed radially inwardly by the arms 9 against the tapered raceway 6 of the inner ring 5. In this state, the outer ring 3 is fitted. When the outer ring 3 is fitted, the arms 9 are received in the respective spaces 11 so as to be spaced from the tapered raceway 4 of the outer ring 3 by the distance δ (see FIGS. 1 and 3B).

Since the roller presser 2 keeps the tapered rollers 7 always coupled to the inner ring 5, the rollers 7 will never separate during transportation or assembling irrespective of whether the outer ring 3 is fitted or not. The roller presser 2 itself will also never separate from the rollers 7 due to engagement between the bridges 13 and the diametrically opposed rollers 7.

Figure 5:
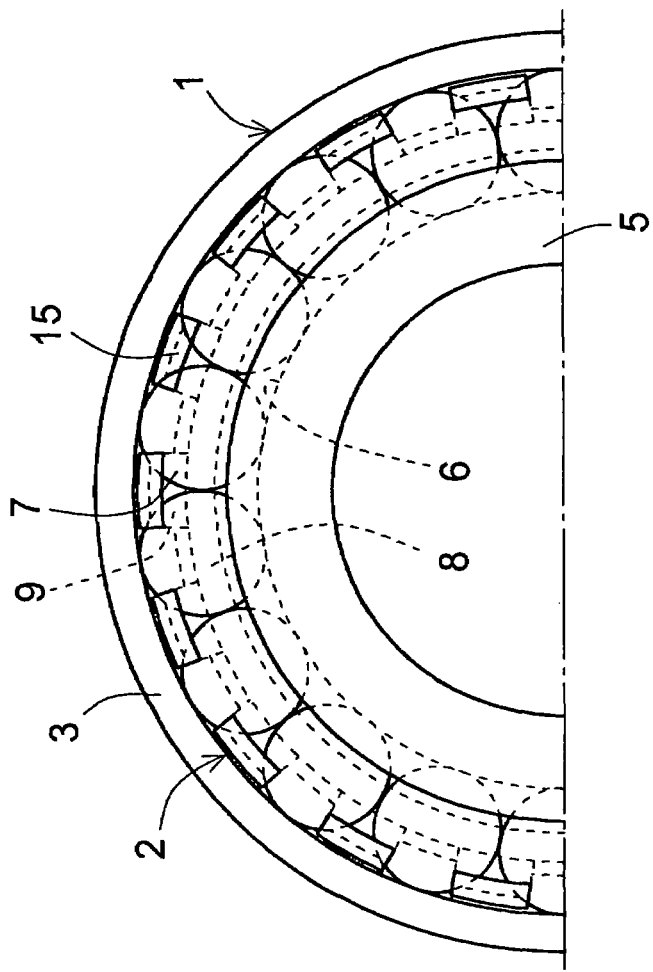
FIG. 5 is a partial side view of the second embodiment.

FIGS. 4 to 6 show the second embodiment, in which instead of the bridges 13 of the first embodiment, each and every arm 9 is provided with a radially inwardly bent claw 15 at its tip so as to engage the large-diameter ends of the adjacent tapered rollers 7 on both sides of each arm 9, thus preventing separation of the roller presser 2. When the arms 9 are inserted into the respective spaces 11, they will radially outwardly expand so that the radially inner ends of the claws 15 can pass through the spaces 11. When the claws 15 reach the large-diameter ends of the rollers 7, the claws 15 will disengage from the outer peripheries of the rollers, and engage their large-diameter end faces (see FIG. 4). Otherwise, this embodiment is identical in structure and function to the first embodiment.

Instead of providing each and every arm 9 with the claws 15, such a claw or claws may be provided only on a pair of diametrically opposed arms or on a single arm.

Figure 8:
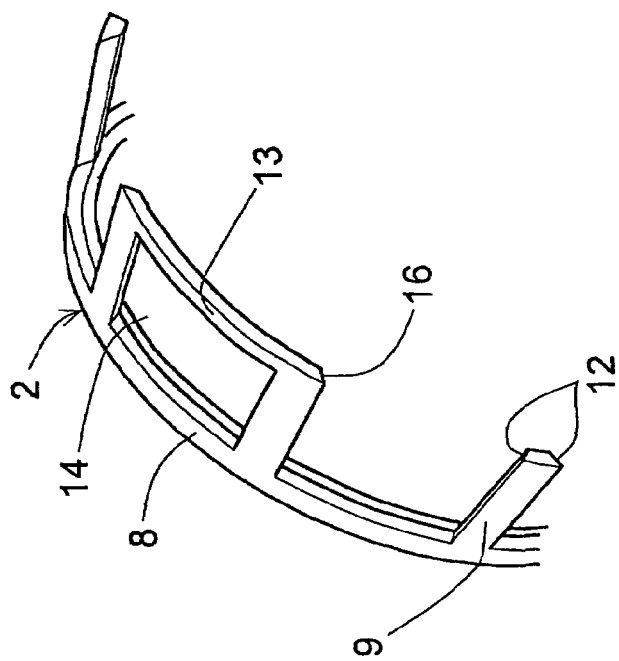
FIG. 8 is a partial perspective view of a roller presser of the third embodiment.

FIGS. 7 and 8 show the third embodiment, in which the roller presser 2 has a number of arms 9 that is half as many as the number of spaces 11 defined between the adjacent tapered rollers 7 and each of the arms 9 is inserted into every other space 11. With this arrangement, any pair of adjacent arms 9 press the two tapered rollers 7 sandwiched therebetween not only against the inner ring 5 but against each other, thereby preventing separation of the rollers 7. In this embodiment, a bridge 13 similar to the bridge 13 of the first embodiment extends between the free ends of a pair of adjacent arms 9 to define a window 14. Otherwise, this embodiment is structurally identical to the first embodiment.

Figure 9:
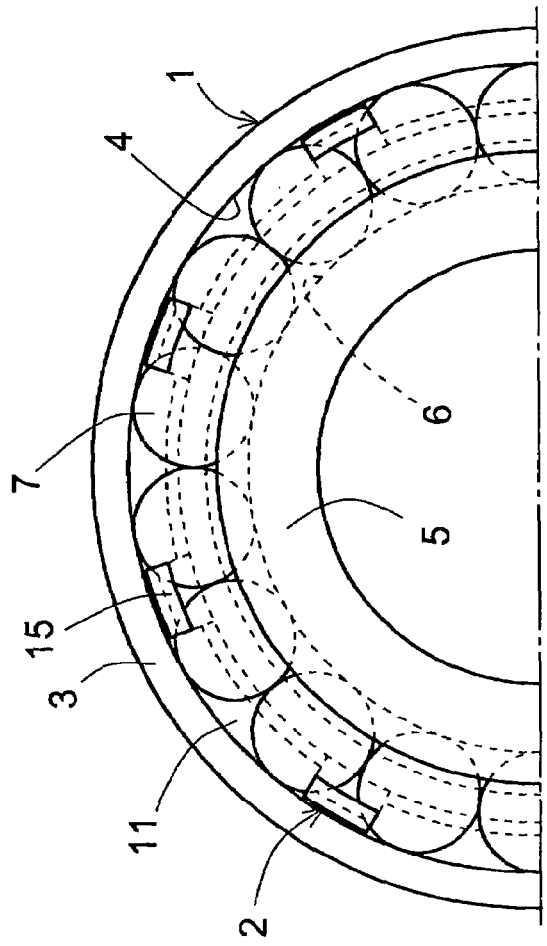
FIG. 9 is a partial side view of a fourth embodiment.

FIGS. 9 and 10 show the fourth embodiment, which differs from the third embodiment in that the bridge 13 is omitted, and instead, a claw 15 similar to the claw 15 of the second embodiment is provided at the free end of each arm 9.

FIGS. 11–13 show the fifth embodiment, which differs from the first embodiment (shown in FIGS. 1–3) in that the roller presser 2, including the bridges 13, is formed of a polyamide, and that because the presser 2 is formed of a polyamide, its parts are thicker than those of the metallic roller presser 2 of the first embodiment.

Though not shown, the roller presser 2 of the third embodiment (FIGS. 7 and 8) may also be formed of a polyamide, including the bridge 13. In this case, too, parts of the roller presser 2 are thicker than those of the metallic presser 2 of the third embodiment.

Figure 14:
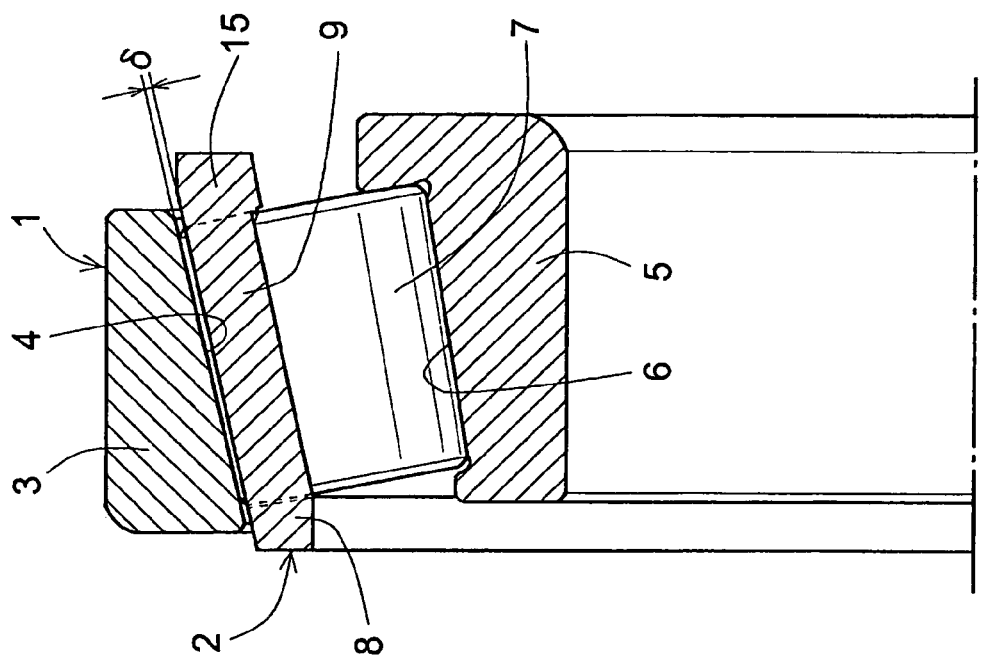
FIG. 14 is a partial sectional view of a sixth embodiment.
Figure 15:
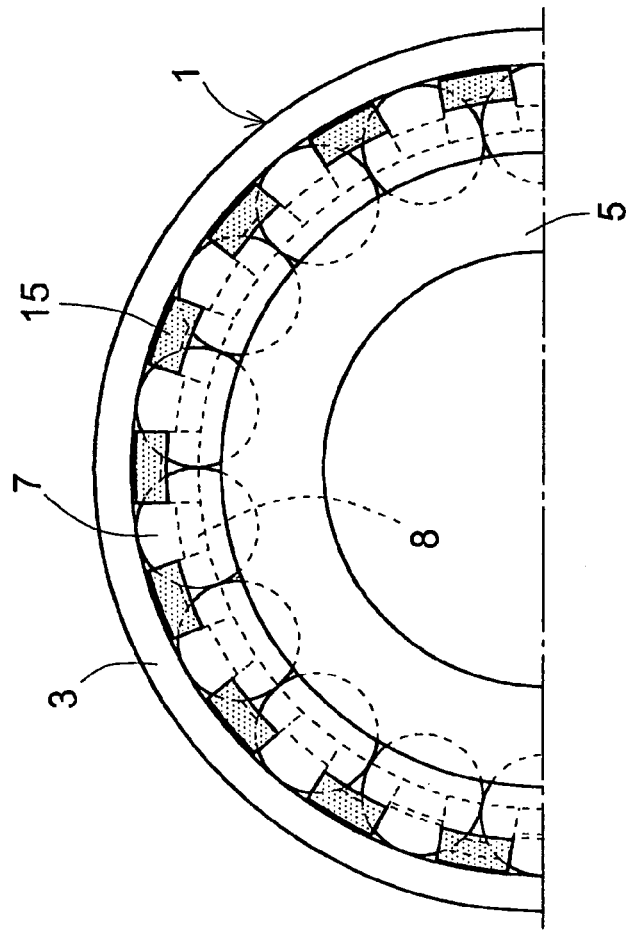
FIG. 15 is a partial side view of the sixth embodiment.
Figure 16:
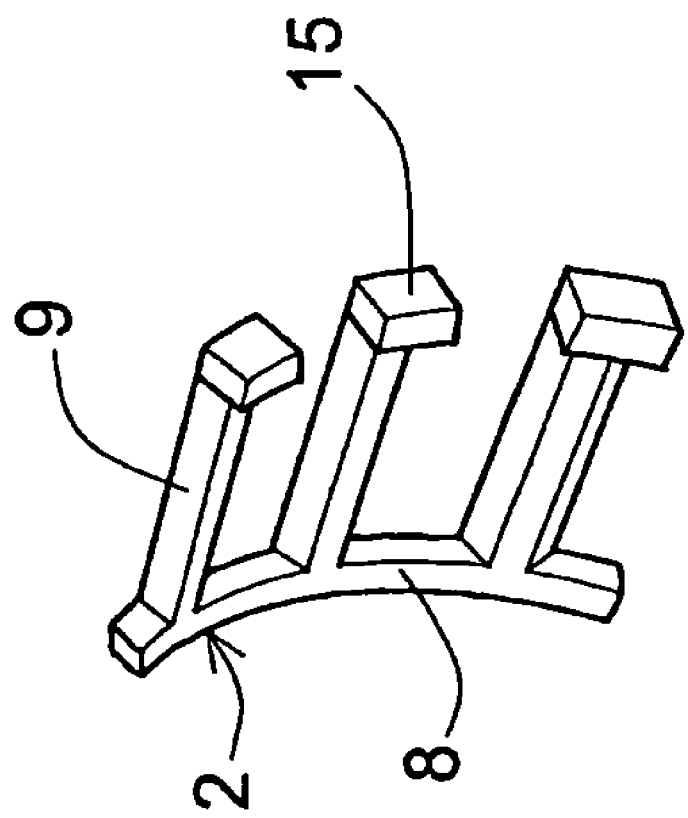
FIG. 16 is a partial perspective view of a roller presser of the sixth embodiment.

FIGS. 14–16 show the sixth embodiment, which differs from the second embodiment (FIGS. 4–6) in that the roller presser, including the claws 15, is formed of a polyamide, and that because the presser 2 is formed of a polyamide, its parts are thicker than those of the metallic roller presser 2 of the second embodiment.

Though not shown, the roller presser 2 of the fourth embodiment (FIGS. 9 and 10) may also be formed of a polyamide, including the claws 15. In this case, too, parts of the presser 2 are thicker than those of the metallic presser 2 of the fourth embodiment.

What is claimed is:

1. A bearing assembly comprising:

a full type tapered roller bearing; and a roller presser;

wherein said tapered roller bearing comprises an outer ring having a tapered raceway having a minimum diameter at one end thereof and a maximum diameter at the other end thereof, an inner ring having flanges at both ends thereof and a tapered raceway extending between said flanges so as to radially oppose said tapered raceway of said outer ring, and a plurality of tapered rollers disposed between said tapered raceways of said inner and outer rings;

wherein adjacent ones of said tapered rollers are substantially in contact with each other, and a space is defined by said tapered raceway of said outer ring and any pair of adjacent tapered rollers;

wherein said roller presser comprises a ring having a diameter smaller than said minimum diameter of said tapered raceway of said outer ring, and a plurality of arms extending from one side of said ring;

wherein said respective arms are circumferentially spaced from each other and are inserted in every or every other one of said spaces so as to be substantially parallel to said tapered raceway of said outer ring, each of said arms having longitudinal edges in contact with the tapered rollers on both sides thereof;

wherein each of said arms has a distal end remote from said ring;

wherein an engaging portion is provided at the distal end of at least one of said arms and engages at least one of said tapered rollers;

wherein the distal ends of at least an adjacent pair of said arms constitute free ends such that said adjacent pair of said arms are not joined to each other at said distal ends thereof.

2. The bearing assembly of claim 1 wherein said arms extend at least from said one end of said tapered raceway of said outer ring to said other end thereof, said ring being disposed radially inside of said tapered raceway of said outer ring near said one end thereof.

3. The bearing assembly of claim 2 wherein said engaging portion is a bridge extending between the distal ends of at least two adjacent ones of said arms.

4. The bearing assembly of claim 2 wherein said engaging portion is a claw provided at the distal end of one of said arms.

5. The bearing assembly of claim 1 wherein said engaging portion is a bridge extending between the distal ends of at least two adjacent ones of said arms.

6. The bearing assembly of claim 1 wherein said engaging portion is a claw provided at the distal end of one of said arms.

7. The bearing assembly of claim 1, wherein the distal ends of a plurality of adjacent pairs of said arms constitute free ends such that, for each of said adjacent pairs of said arms, said arms are not joined to each other at said distal ends thereof.

8. A bearing assembly comprising:

a full type tapered roller bearing; and a roller presser;

wherein said tapered roller bearing comprises an outer ring having a tapered raceway having a minimum diameter at one end thereof and a maximum diameter at the other end thereof, an inner ring having flanges at both ends thereof and a tapered raceway extending between said flanges so as to radially oppose said tapered raceway of said outer ring, and a plurality of tapered rollers disposed between said tapered raceways of said inner and outer rings;

wherein adjacent ones of said tapered rollers are substantially in contact with each other, and a space is defined by said tapered raceway of said outer ring and any pair of adjacent tapered rollers;

wherein said roller presser comprises a ring having a diameter smaller than said minimum diameter of said tapered raceway of said outer ring, and a plurality of arms extending from one side of said ring;

wherein said respective arms are circumferentially spaced from each other and are inserted in every or every other one of said spaces so as to be substantially parallel to said tapered raceway of said outer ring, each of said arms having longitudinal edges in contact with the tapered rollers on both sides thereof;

wherein at least one of said arms has an engaging portion that engages at least one of said tapered rollers;

wherein said arms have free ends remote from said ring, and wherein said engaging portion is a claw provided at the free end of one of said arms.

9. The bearing assembly of claim 8 wherein said arms extend at least from said one end of said tapered raceway of said outer ring to said other end thereof, said ring being disposed radially inside of said tapered raceway of said outer ring near said one end thereof.

* * * * *